Oct. 7, 1969  D. TILLAY ET AL  3,470,846
MARKING THE LINE OF FLIGHT OF AN AIRCRAFT
Filed March 13, 1967  2 Sheets-Sheet 1
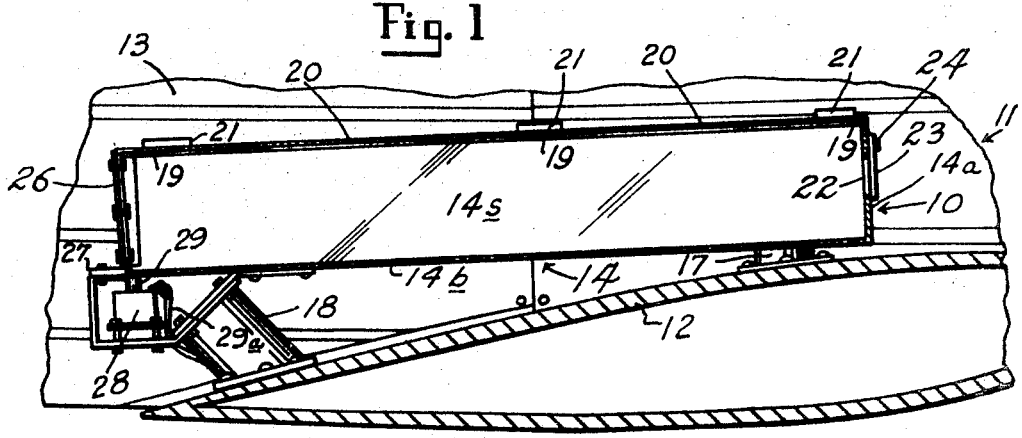
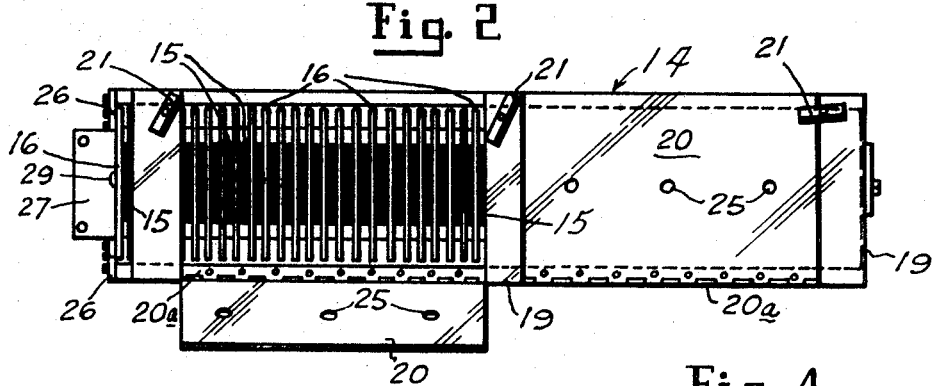
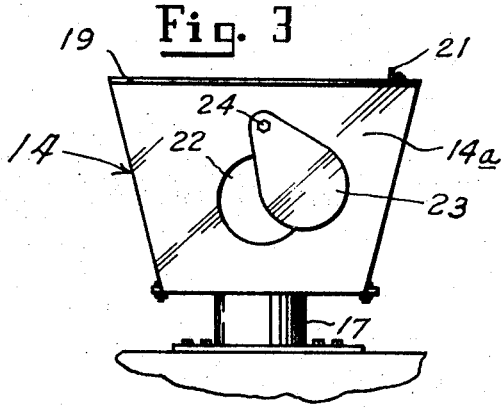
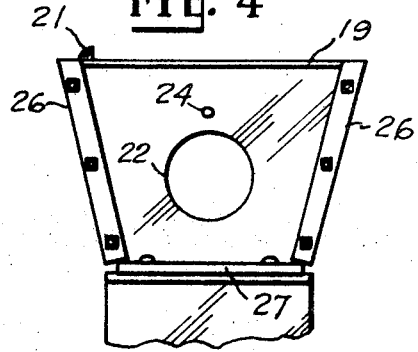
INVENTORS
DALE TILLAY
BY MARVIN O. BLEVINS
Wells & St. John
ATTYS.

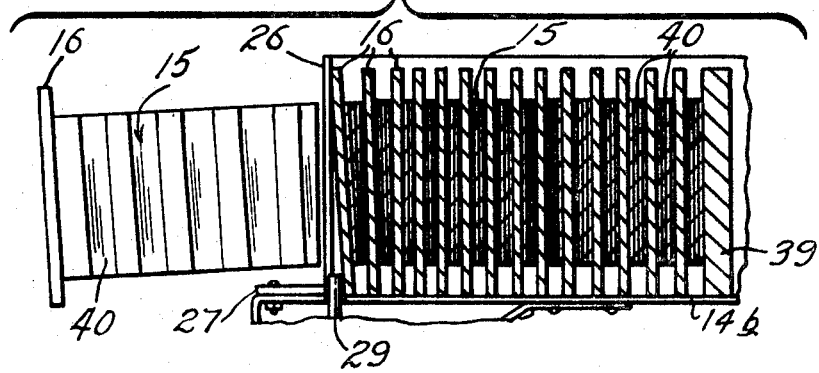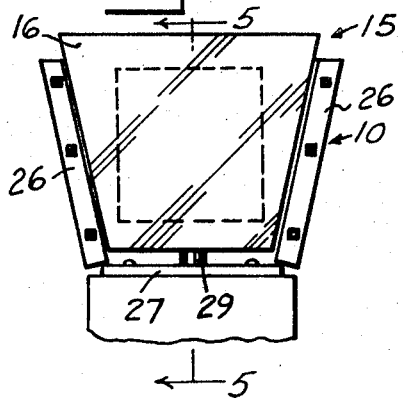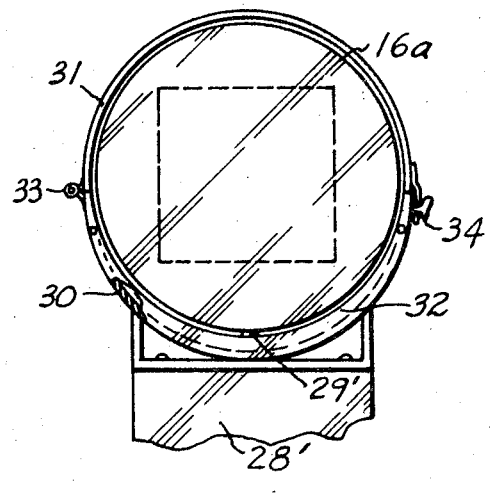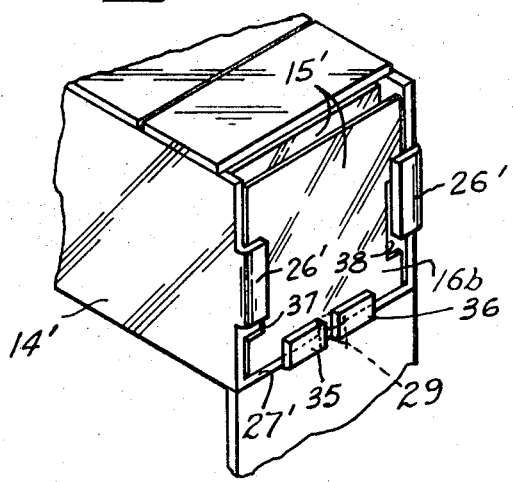

United States Patent Office 3,470,846
Patented Oct. 7, 1969

3,470,846
MARKING THE LINE OF FLIGHT OF AN AIRCRAFT
Dale Tillay, Rte. 1, and Marvin O. Blevins, Rte. 4, both of Walla Walla, Wash. 99362
Filed Mar. 13, 1967, Ser. No. 622,648
Int. Cl. G09f 9/00; G08g 1/12
U.S. Cl. 116—124                                    3 Claims

ABSTRACT OF THE DISCLOSURE

A plurality of dispensible markers are placed in a container on an aircraft. Each marker has a flexible strip secured to a base member. Solenoid means controlled by the pilot ejects the markers one at a time as air pressure feeds the markers rearwardly from the front of the container.

REFERENCE TO RELATED APPLICATIONS

A marker unit of a type used in the device disclosed here is shown in our application for patent, Serial No. 580,316, filed Sept. 19, 1966, and now Patent No. 3,428,019, for "Drop Marker."

This invention is particularly directed toward dispensing markers from an aircraft while it is flying in such a manner as to leave on the terrain a marker or a series of markers visible from the air to mark the path of the aircraft dispensing the markers. It is the practice now to use aircraft to spread many materials on the ground and on the vegetation thereon. These materials may be liquids, or solids. In agricultural practices they spread seeds, pesticides, fertilizers and the like by aircraft.

It is the purpose of the present invention to provide a method and means whereby the aircraft, in addition to spreading its useful load, may dispense visible markers of a character that will show the path followed by aircraft to a second flight adjacent thereto so that coverage of an area with the material may be made with minimum overlapping or skipping.

According to the present invention, a marker comprising a disposable paper streamer attached to a piece of cardboard, which serves as a weight, is ejected from a container having several of the markers therein. Air pressure fed into the container through an opening in the nose of the container feeds the markers to the rear. The ejection is accomplished by a solenoid operated plunger engaging the rearmost marker.

Our invention employs a marker assembly embodying a divider and weight furnishing member of stiff sheet material and a streamer of flexible foldable material affixed thereto. A multiplicity of the assemblies are stored on or in the aircraft in compact side by side relation in a supporting container that is secured on or in some part of the aircraft so that upon ejection of an assembly from the stored group the assembly is freed of the aircraft in a manner that causes the streamer to expand while the heavier stiff divider member causes the assembly to drop to earth behind the aircraft.

The nature of our invention and the advantages thereof will be more fully understood from the following description and the accompanying drawings wherein a preferred mechanism for carrying out the operation of marking the path of the aircraft is shown. It should be understood, however, that the drawings and description are illustrative only and are not intended to limit the scope of the invention.

In the drawings:

FIGURE 1 is a side view of a dispenser utilized in our invention shown as mounted on a portion of a wing of an aircraft;

FIGURE 2 is a plan view of the dispenser with one cover portion lifted to show the markers therein;

FIGURE 3 is a front end view of the dispenser;

FIGURE 4 is a rear end view of the dispenser as it appears empty;

FIGURE 5 is a somewhat diagrammatic sectional view taken along line 5—5 in FIG. 3 illustrating the manner in which markers discharge from the dispenser;

FIGURE 6 is a rear end view of the dispenser showing a marker lifted for discharge;

FIGURE 7 is a view like FIGURE 6 of a modified dispenser and marker showing how markers with circular base members are discharged; and FIGURE 8 is a perspective view showing a modified discharge end construction of the dispenser.

DETAILED DESCRIPTION

According to our invention, we employ a suitable dispenser 10 on the aircraft. This dispenser 10 may be mounted anywhere on the aircraft 11, such that the dispensed markers from it will not become entangled with any part of the aircraft after leaving the dispenser. A convenient place for the dispenser on the more commonly used aircraft for spreading materials over the ground is on a wing 12, at a point spaced laterally from the fuselage 13. However, this is merely an example of a place on the aircraft from which the markers may be discharged.

The dispenser shown in FIGURES 1 through 5 comprises a container 14 which is shaped to be complementary in cross section to the periphery of the base member 16 of the markers 15. This base member 16 is shown in FIGURE 6 as a trapesium in which the two non-parallel sides are equal. FIGURES 7 and 8 show base members of different configuration. The trough like container has supports 17 and 18 by which it may be mounted to the aircraft. The open top of the container 14 is braced by two or three cross ties 19 and it is covered by a door or a pair of doors 20 that are hinged to one side wall 14s of the container 14 by hinges 20a and held down against the other side by any suitable type fasteners. The front end wall 14a of the container 14 is provided with an opening 22 which can be more or less exposed by a cover 23 which is secured to the end 14a by a pivot member 24 that is tightened so it will hold the cover 23 in any position adjusted. This opening may also be a portion of the front end of a streamlined nose cone fitted to the front end of the dispenser. The doors 20 have a series of small apertures 25 therein.

The rear end of the container 14 is open but on the sides thereof are two flanges 26 that restrict the rear exit area. The bottom wall 14b of the container 14 is extended beyond the side walls 14s thereof to provide mounting for a ledge plate 27 that cooperates with the flanges 26 to provide a backstop for the base 16 of a marker 15.

A solenoid 28 is mounted on the container bottom 14b and has its core 29 projecting through the bottom 14b immediately adjacent to the plate 27. The lower end of the rear base member 16 extends over the core 29 when the core 29 is retracted. When the solenoid 28 is energized, it lifts the core 29 and this in turn raises the base member 16 thereon high enough for the side edges of the base member to clear the flanges 26 so that marker 15 can move rearwardly over the ledge 27. As marker 15 is ejected rearwardly, the enlarged base member 15 pulls open the streamer 40 as it enters the relatively moving air stream (FIG. 5). The solenoid is provided with suitable electrical connections 29a to a control switch (not shown) at the pilot's position in the aircraft and to a source of electrical energy in the aircraft so that the pilot can actuate the solenoid at will.

The modification shown in FIGURE 7 operates in the same way as the form of device shown in FIGURES 1 through 6. Here the base member 16a of the marker is circular. The modified container comprises a semicircular trough 30 with a hinged cover 31. A stop flange 32 normally stops the base member 16a from moving rearwardly. However, when the solenoid 28' lifts its core 29', this lifts the member 16a above the flange 32 for rearward discharge. The cover 31 is shaped to permit this left of the member 16a to take place. The hinge 33 and the latch 34 are conventional.

The modification, illustrated in FIGURE 8, of the rear end of the container 14' consists of forming flanges 26' integral with the sides 14s' of the container. The ledge 27' is provided with lips 35 and 36 which cooperate with the flanges 26' to hold the rearmost marker 15' so it can be lifted by the core 29 of the solenoid. In this modification the marker base member 16b is generally square with cut-outs 37 and 38 that are matched with the flanges 26' when the marker 15' is lifted clear of the lips 35 and 36.

Any suitable force can be used to urge the markers 15 rearwardly. Gravity or springs are commonly used to move stacks of material in a container and can be used here, too. However, as shown, we prefer to use air plus a slight incline of the container downwardly to the rear. When the aircraft is aloft is the time for discharging the markers. At this time the air is moving rearwardly relative to the dispenser and air flow into the container 14 via the front aperture 22 has ample force to advance the markers. Air can escape through the apertures 25. This method of discharge enables use of the entire space within the container for the markers 15 whereas springs take up space. We use a pressure transmittal block 39 in front of the markers to keep them from tipping over.

The block 39, shown in FIG. 5 of the drawings, serves to press against the front marker and keep the streamer part of this marker from unfolding in the wind that blows into the container 14 through the front opening 22 when the aircraft is in flight. The aperture 22 directs the air against the block 39 which in turn pushes the markers rearward. The openings 25 in the cover doors 20 serve another purpose. They show to the operator how nearly empty of markers the container 14 may be.

It is believed that the nature and advantages of our invention will be apparent from the foregoing description.

We claim:
1. Means for dropping a series of markers from an aircraft while it is in flight to indicate its line of flight comprising:
   an elongated container having means to mount it to an aircraft;
   a multiplicity of markers, each comprising a stiff base member and a lighter, flexible, streamer-like strip attached to the base member and folded upon itself to lie flat against the base member, the markers being positioned in the container with the base members extended crosswise of the container and each base member having a bare face toward the folded strip of the next adjacent marker;
   manually controlled means secured to the container operable to eject the markers one at a time from one end of the container; and
   means operable while the aircraft is in flight to exert pressure on the markers endwise of the container toward said end sufficient to advance the remaining markers toward said end after each marker is ejected.
2. The invention defined in claim 1 wherein the container has its longitudinal axis in the direction of flight with the end thereof from which the markers are ejected opening rearwardly; and
   the means operable to exert pressure on the markers comprises an air inlet at the front end of the container operable to direct air pressure rearward toward the markers.
3. The method of dispensing path makers each having a stiff base with a flexible streamer folded thereon, from an aircraft in flight, which comprises:
   supporting the markers by the aircraft and confining said markers in side by side relation in a row;
   moving the markers in the row toward discharge as each marker is ejected, such movement being effected by the force of air due to forward flight of the aircraft; and
   ejecting the markers with the stiff base ahead successively from the row into the airstream past the aircraft.

References Cited
UNITED STATES PATENTS

| | | | |
|---|---|---|---|
| 1,985,678 | 12/1934 | Hand | 281—5 |
| 2,646,786 | 7/1953 | Robertson | 221—79 X |
| 3,081,907 | 3/1963 | Scerbo | 221—267 X |
| 3,164,801 | 1/1965 | Nicholl | 340—25 |
| 3,280,549 | 10/1966 | Hsu | 116—124.9 X |
| 3,360,728 | 12/1967 | Stevinson et al. | 325—114 |

LOUIS R. PRINCE, Primary Examiner

D. M. YASICH, Assistant Examiner

U.S. Cl. X.R.

340—24